United States Patent
Kandler et al.

(10) Patent No.: US 10,252,583 B2
(45) Date of Patent: Apr. 9, 2019

(54) FAIL SAFE DEVICE, A TIRE PRESSURE MEASUREMENT SYSTEM, A VEHICLE, A METHOD FOR MONITORING, AND A COMPUTER PROGRAM

(71) Applicant: Infineon Technologies AG, Neubiberg (DE)

(72) Inventors: Michael Kandler, Sauerlach (DE); Thomas Lange, Munich (DE); Jooil Park, Sungnam (KR)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 15/697,546

(22) Filed: Sep. 7, 2017

(65) Prior Publication Data

US 2018/0065428 A1    Mar. 8, 2018

(30) Foreign Application Priority Data

Sep. 7, 2016 (DE) .................. 10 2006 116 698

(51) Int. Cl.
| | |
|---|---|
| *B60C 23/04* | (2006.01) |
| *G01L 17/00* | (2006.01) |
| *G08C 17/02* | (2006.01) |
| *B60C 23/06* | (2006.01) |

(52) U.S. Cl.
CPC ...... *B60C 23/0416* (2013.01); *B60C 23/0433* (2013.01); *B60C 23/0481* (2013.01); *B60C 23/0488* (2013.01); *B60C 23/061* (2013.01); *G01L 17/00* (2013.01); *G08C 17/02* (2013.01)

(58) Field of Classification Search
CPC combination set(s) only.
See application file for complete search history.

(56) References Cited

U.S. PATENT DOCUMENTS

| | | | |
|---|---|---|---|
| 5,913,240 | A | 6/1999 | Drahne et al. |
| 6,446,023 | B1 | 9/2002 | Ernst |
| 7,406,876 | B2 | 8/2008 | Krozer et al. |
| 7,432,851 | B2 | 10/2008 | Dulac |
| 7,661,300 | B2 * | 2/2010 | Sinnett .................. B60C 23/064 73/146.5 |
| 7,942,047 | B2 | 5/2011 | Vassilieff et al. |
| 8,035,502 | B2 | 10/2011 | Heise et al. |
| 8,065,911 | B2 | 11/2011 | Taylor et al. |
| 8,165,827 | B2 | 4/2012 | Savaresi et al. |

(Continued)

FOREIGN PATENT DOCUMENTS

| | | |
|---|---|---|
| DE | 199 17 034 C1 | 11/2000 |
| DE | 10 2006 005 143 A1 | 8/2007 |

(Continued)

*Primary Examiner* — Travis R Hunnings
(74) *Attorney, Agent, or Firm* — Design IP

(57) ABSTRACT

Embodiments provide a fail-safe device, a tire pressure measurement system, a vehicle, a tire, a method and a computer program for monitoring a first sensor of a tire pressure monitoring system. The fail-safe device includes a first input for a first signal from the first sensor. The first signal indicates a first physical quantity. The fail-safe device includes a second input for a second signal from a second sensor. The second signal indicates a second physical quantity. The fail-safe device further includes a control module to verify the first signal based on the second signal and a physical relation between the first and the second physical quantities.

17 Claims, 4 Drawing Sheets

(56) References Cited

U.S. PATENT DOCUMENTS

| | | |
|---|---|---|
| 8,296,080 B2 | 10/2012 | Mancosu et al. |
| 8,402,821 B2 | 3/2013 | Fink et al. |
| 2002/0166371 A1 | 11/2002 | Ratti et al. |
| 2005/0103100 A1 | 5/2005 | Miyoshi et al. |
| 2006/0212193 A1 | 9/2006 | Breed |
| 2009/0171525 A1* | 7/2009 | Yamaguchi ......... B60C 23/0416 701/31.4 |
| 2012/0310469 A1* | 12/2012 | Vassilieff ............ B60C 23/0481 701/30.3 |
| 2013/0054078 A1* | 2/2013 | Anderson ............. B60C 23/002 701/29.1 |
| 2015/0247780 A1 | 9/2015 | Kretschmann et al. |
| 2016/0011279 A1 | 1/2016 | Rasbornig et al. |
| 2016/0129737 A1* | 5/2016 | Singh .................. B60C 23/0488 73/146.3 |
| 2016/0167464 A1* | 6/2016 | Freytag ................ G01M 17/02 73/146 |

FOREIGN PATENT DOCUMENTS

| | | |
|---|---|---|
| DE | 10 2007 010 781 A1 | 12/2007 |
| DE | 10 2008 049 047 A1 | 4/2010 |
| DE | 10 2014 226 705 A1 | 6/2016 |
| WO | 2015055722 A1 | 4/2015 |
| WO | 2015137951 A1 | 9/2015 |

\* cited by examiner

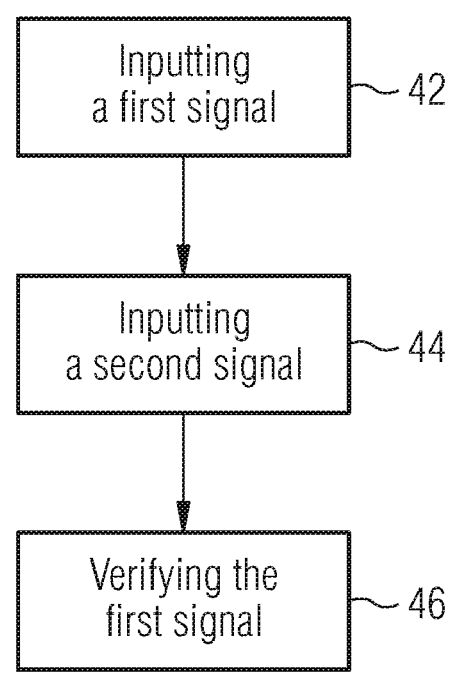

FAIL SAFE DEVICE, A TIRE PRESSURE MEASUREMENT SYSTEM, A VEHICLE, A METHOD FOR MONITORING, AND A COMPUTER PROGRAM

FIELD

The present disclosure relates generally to a fail-safe device, a tire pressure measurement system, a vehicle, a method and a computer program for monitoring a sensor of a tire pressure measurement system.

BACKGROUND

Wheel units are electronic devices, which are used to monitor wheel properties or parameters. For example, monitoring a tire pressure has become part of governmental regulations in many countries, such that tires or wheels of vehicles are equipped with tire pressure measurement devices, which communicate signals indicative of a tire pressure to a control unit or controller of the vehicle. For example, tire pressure values can be determined and displayed to a user of the vehicle, warning indications can be generated if the tire pressure decreases below a critical threshold.

During manufacturing, production and service of the vehicles, wheels or tires, there may be a desire to communicate with wheel units, for example, for programming, configuration, set up, or security purposes. For example, a wheel unit of a Tire Pressure Monitoring System (TPMS) may have a need of a possibility to receive data during production or service. Today, a means to transfer data is electromagnetic radiation at 125 kHz, which is also referred to as Low Frequency (LF) communication. For example, production lines and service facilities are equipped with 125 kHz electromagnetic data transmitters. The wheel units are equipped with corresponding LF-receive antennas or coils, LF-receivers, respectively. In general the wheel units may transmit and receive data.

In vehicular systems processing TPMS data, for example, if the data relates to safety relevant procedures or functions, a certain Automotive Safety Integrity Level (ASIL) may be required. One aspect of ASIL is a fail-safe functionality, for example, enabling failure detection and transfer into a safe, emergency or conservative operating state in case of failure detection.

SUMMARY

Embodiments provide a fail-safe device for a tire pressure measurement system, a vehicle, a tire, a method and a computer program for monitoring a sensor of a tire pressure measurement system. Embodiments enable controlling, monitoring, or providing security for a physical quantity measured by a TPM module. Embodiments may allow verifying a first sensor signal by evaluation of a second sensor signal based on a physical relation between the first and second sensor signals.

One or more embodiments provide a fail-safe device for monitoring a first sensor of a tire pressure monitoring system. The fail-safe device includes a first input for a first signal from the first sensor. The first signal indicates a first physical quantity. The fail-safe device further includes a second input for a second signal from a second sensor. The second signal indicates a second physical quantity. The fail-safe device further includes a control module to verify the first signal based on the second signal and a physical relation between the first and second physical quantities. Embodiments may enable a more reliable operation of the first sensor through verification of the first sensor signal based on the second sensor signal and a physical relation between the first and second physical quantities.

In a further embodiment the control module may be configured to generate a signal indicating a failure in case the verification fails such that further measures or mechanisms can be triggered, e.g. a transfer into a safe state, emergency state, generation of a warning etc.

According to one or more embodiments, at least one of the first and second sensors may be an element of the group of a pressure sensor, an acceleration sensor, a magnetic field sensor and a temperature sensor. Embodiments may enable exploitation of physical relations between measured quantities at a tire pressure module. The first and second sensors may be included in a tire pressure monitoring module. Embodiments also provide a tire pressure measurement module including one or more sensors and an embodiment of the fail-safe device, such that the embodiment of the tire pressure measurement module may provide integrated fail-safe functionality.

The first signal may indicate a tire pressure of a tire of a vehicle, and the second signal may indicate a rotational speed and a contact patch size or footprint length of the tire. Since there is a physical relation between the tire pressure and the rotational speed of the tire, between the tire pressure and a contact patch size or footprint length of the tire, respectively, embodiments may enable a verification of one of these signals based on the other. For example, the second sensor is an acceleration sensor or a magnetic field sensor. In some embodiments the control module may be configured to determine noise level information of the first signal, to determine rotational speed information based on the noise level information and to verify the rotational speed information based on the second signal. In another embodiment the control module may be configured to verify the first signal by correlating a noise level or a rotational speed indicated by the first signal with a rotational speed indicated by the second signal. The control module may be configured to generate warning information if the correlation lies below a threshold. Embodiments may then allow indicating a warning to an operator of the vehicle in case of failed verification or implausible signals.

In one or more embodiments, the control module may be configured to determine footprint length information of the tire based on the first signal, and to verify the footprint length information based on the second signal. For example, the control module may be configured to verify the first signal by correlating a footprint length of the tire indicated by the first signal with a footprint length of the tire indicated by the second signal. The control module is configured to generate warning information if the correlation lies below a threshold. At least in some embodiments the first and second physical quantities are different.

One or more embodiments further provide a tire pressure measurement system including an embodiment of the above-described fail-safe device. Another embodiment is a vehicle including an embodiment of the tire pressure measurement system.

One or more embodiments further provide a method for monitoring a first sensor of a tire pressure monitoring system. The fail-safe device includes inputting a first signal from the first sensor, the first signal indicating a first physical quantity. The method further includes inputting a second signal from a second sensor, the second signal indicating a second physical quantity. The method further includes verifying the first signal based on the second signal and a physical relation between the first and second physical quantities.

One or more embodiments further provide a computer program product including a computer readable medium having computer readable program code embodied therein, the computer readable program code being configured to implement at least one of or a combination of the above-described methods, when being loaded on a computer, a processor, or a programmable hardware component.

Embodiments further provide a tire, a TPMS, or a vehicle including one or more embodiments as described above.

BRIEF DESCRIPTION OF THE DRAWINGS

Some other features or aspects will be described using the following non-limiting embodiments of apparatuses/devices and/or methods and/or computer programs by way of example only, and with reference to the accompanying figures, in which

FIG. 4 shows a block diagram of a flow chart of an embodiment of a method for monitoring a first sensor of a tire pressure monitoring system.

DETAILED DESCRIPTION

In the following, some components may be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
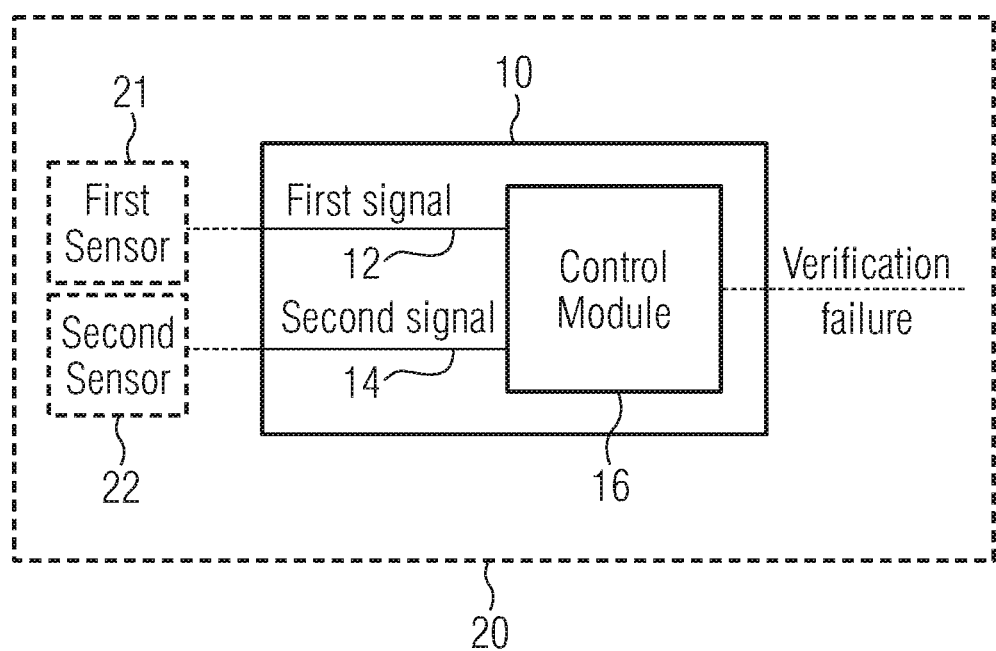
FIG. 1 shows a block diagram of a fail-safe device according to one or more embodiments.

FIG. 1 shows an embodiment of a fail-safe device 10 for monitoring a first sensor 21 of a tire pressure monitoring system 20. The fail-safe device 10 comprises a first input 12 for a first signal from the first sensor 21. The first signal indicates a first physical quantity. The device 10 further comprises a second input 14 for a second signal from a second sensor 22. The second signal indicates a second physical quantity. The device 10 further comprises a control module 16 to verify the first signal based on the second signal and a physical relation between the first and second physical quantities.

Another embodiment is a tire pressure monitoring system 20 comprising an embodiment of the fail-safe device 10. Yet another embodiment is a vehicle or a tire comprising the TPMS 20. In the following a vehicle may comprise one or more tires or wheels, and a vehicle can be any vehicle using tires, as, for example, a car, a van, a truck, a bus, a plane, a bike, a motorbike, etc. Although, some embodiments may be exemplified using a car, any other vehicles can be utilized in embodiments.

In embodiments, the control module 16 may be implemented using electronic components, such a non-linear components, analog and/or digital components, one or more processing units, one or more processing devices, any means for processing, such as a processor, a computer or a programmable hardware component being operable/configured with accordingly adapted software. In other words, the described functions of the control module 16 may as well be implemented in software, which is then executed on one or more programmable hardware components. Such hardware components may comprise a general purpose processor, a Digital Signal Processor (DSP), a micro-controller, a Field Programmable Gate Array (FPGA), a Programmable Logic Device, a Programmable Array Logic (PAL) etc. In embodiments, the control module 16 may also be implemented using one or more Application Specific Integrated Circuits (ASIC).

Here and in the following an input may be a contact or an interface to conduct a signal or information to the respective component. Such information or signal may be digital or analog. Hence an input may be implemented using one or more wires, circuit paths, conductors, etc. If multiple signals or information components are to be input, such input may be carried out in a serial or in a parallel manner. A sensor may be a device or component capable of sensing or measuring a physical quantity and configured to output a signal, e.g. a voltage or current signal, which is indicative of said physical quantity. In the following a number of embodiments will be described using different sensors sensing different physical quantities. As further indicated by the broken line output in FIG. 1, in embodiments the control module 16 may have further inputs and/or outputs. For example, the control module 16 may be configured to generate a signal indicating a failure in case the verification fails, such as a warning signal or indication.

In general there are multiple possibilities on how to verify a sensor signal in terms of fail-safe, how to make a sensor-product fail-safe, respectively. Some embodiments may also use continuous self-diagnosis, redundant sensors, or diverse sensors. An example for self-diagnosis is an electric conductor, which is attached to the surface of a micro-mechanic sensor. In case of a mechanical failure or a break of the micro mechanic structure the conductor is interrupted and, hence, can be continuously monitored or registered to detect mechanical failure of the micro mechanical structure. However, failure of a diagnosis device might not be precluded. Redundant sensors are based on a comparison of signals of identically constructed sensors. However, it cannot be precluded, for example, that in case of a strong mechanical shock both sensors suffer from the same damage and failure may therefore not be detected based on the comparison. Diverse sensors may be more robust as the same physical quantities are captured using different measurement principles.

At least some embodiments are based on the finding that diverse sensors can be utilized in a tire pressure measurement module, which sense different physical quantities. The physical quantities are however related to each other via a physical relation or due to design, such that one physical quantity may be used to verify the other. The sensors may be integrated in a TPMS-wheel or —tire unit. Some example sensors, which may be integrated in a wheel unit with reasonable efforts, include: a p-sensor (i.e., a pressure sensor with a pressure sensitive membrane); an a-sensor (i.e., an acceleration sensor, e.g., using a elastically mounted defined mass, or a micro mechanic device); a B-sensor (i.e., a magnetic field sensor, e.g., sensing magnetic field dependent electron scattering); a T-detector (e.g., a temperature dependent diode voltage or temperature dependent resistor); and a T-sensor (e.g., a Proportional To Absolute Temperature (PTAT) sensor or a band gap circuit).

Figure 2:
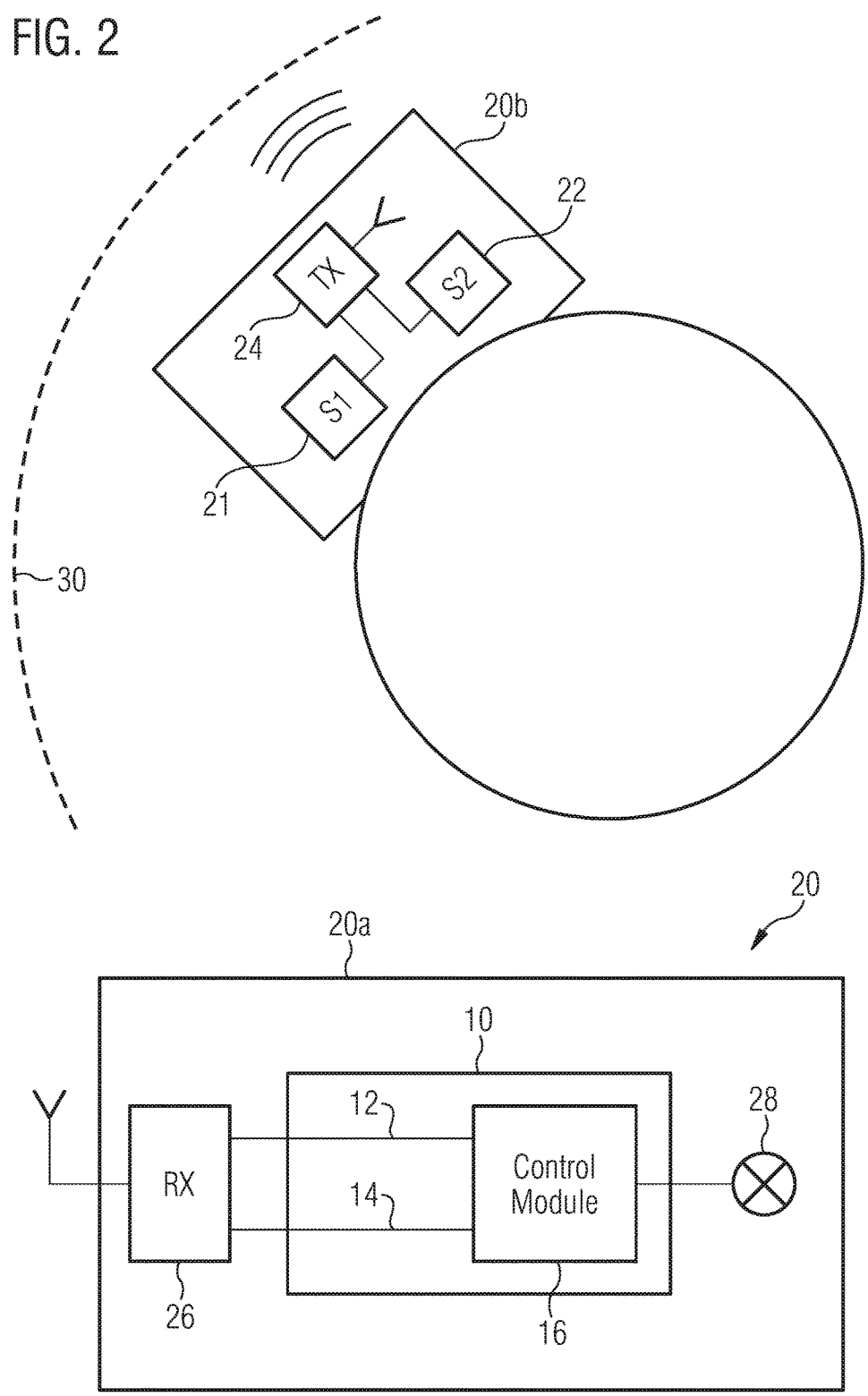
FIG. 2 illustrates a block diagram of a Tire Pressure Monitoring System (TPMS) including a fail-safe device according to one or more embodiments.

FIG. 2 illustrates an embodiment of a TPMS 20 comprising an embodiment of a fail-safe device 10. In the embodiments shown in FIG. 2 the fail-safe device 10 is comprised in a stationary unit 20a of the TPMS 20. The stationary unit 20a further comprises a receiver (Rx) 26, which is configured to wirelessly receive signals from a tire or wheel unit 20b of the TPMS 20. A tire unit or tire pressure measurement module 20b of the TPMS 20 comprises the first sensor 21, the second sensor 22 and a transmitter (Tx) 24, which is configured to wirelessly transmit the first signal from the first sensor 21 and the second signal from the second sensor 22 to the stationary unit 20a. Another embodiment is hence a stationary unit 20a and/or a wheel unit 20b of a TPMS 20 comprising an embodiment of the fail-safe device 10. In the following embodiments the first and second physical quantities are different.

The receiver 26 and the transmitter 24 may be implemented as any means for receiving, means for transmitting or transceiving, i.e. receiving or transmitting or both, one or more receiver, transmitter or transceiver units, one or more receiver, transmitter or transceiver devices and it may comprise typical receiver, transmitter and/or transceiver components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, one or more coils, etc. For example Low Frequency (LF) transmission may be used. LF may represent radio frequencies in the range of 30 kHz-300 kHz, with wavelength ranges from one to ten kilometers. In other embodiments other frequencies can be used, e.g. Radio Frequency (RF) transmission, such as Ultra High Frequency (UHF), e.g. 300 MHz to 3000 MHz.

The Rx 26 then provides the first and second input signals to the fail-safe device 10. In embodiments the first sensor 21 may be an element of the group of a pressure sensor, an acceleration sensor, a magnetic field sensor and a temperature sensor, the second sensor 22 may be an element of the group of a pressure sensor, an acceleration sensor, a magnetic field sensor and a temperature sensor. As will be detailed in the following the first and second sensors 21, 22 are different and measure or sense different physical quantities. Generally, in embodiments a sensor may correspond to at least one of a pressure sensor, an acceleration sensor, a magnetic field sensor, a temperature sensor, an inertial sensor, a micro-mechanical sensor, or a gyroscope for generating a signal based on which a state of movement or any other physical quantity is detectable. In some embodiments the system may further comprise an acceleration sensor, an energy harvester, or a TPMS sensor, e.g. to obtain information on a rotational frequency of a wheel.

Figure 3:
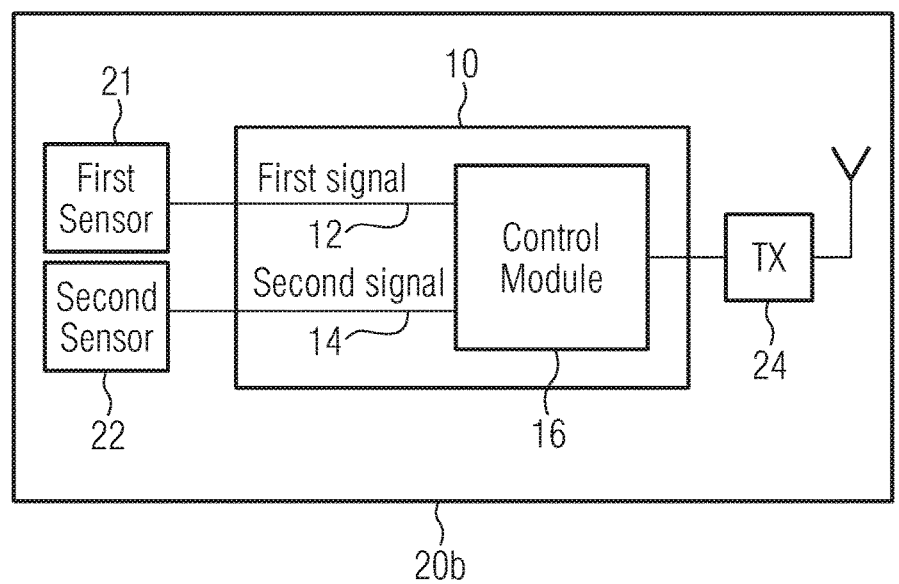
FIG. 3 illustrates another block diagram of a TPMS including a fail-safe device according to one or more embodiments.
Figure 3:
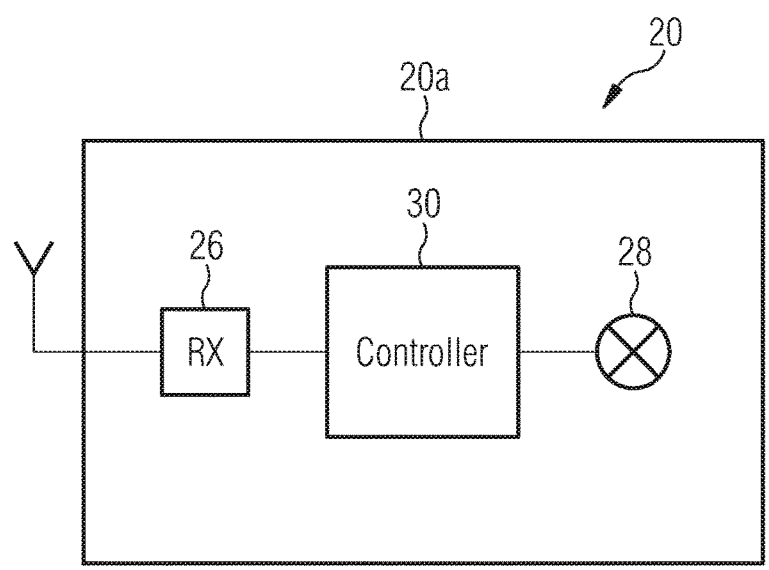

FIG. 3 illustrates another embodiment of a TPMS 20 comprising an embodiment of a fail-safe device 10. FIG. 3 shows similar components as FIG. 2, where the same reference signs indicate the same components. In the embodiment shown in FIG. 3 the fail-safe device 10 is comprised in the wheel unit 20b and an output of the fail-safe device 10 is provided to Tx 24 for transmission to the stationary unit 20a. First and second sensors 21, 22 are coupled to the inputs 12, 14 of the control module 16 of the fail-safe device 10. The control module 16 is configured to generate a signal indicating a failure in case the verification fails. Said signal is coupled to the Tx 24 and transmitted to the Rx 26 of the stationary unit 20a of the TPMS 20. The stationary unit 20a may further comprise a controller 30, which can be implemented in a similar way as control module 16. The controller 30 may be further coupled to a warning light or indicator 28. An embodiment of a fail-safe device 10 may hence be comprised in a stationary unit 20a and/or a wheel unit 20b of a TPMS 20.

Information on a rotational frequency of a wheel or state of motion may be obtained using an acceleration sensor, which may be further comprised in a system. The acceleration sensor may be installed on the wheel such that a sensitive axis of the acceleration sensor has a radial orientation. Hence it senses a change in the acceleration of gravity when the wheel turns, in particular a +/−g change. Of course, other orientations or a multi-axis-sensor is also conceivable in some embodiments.

In other embodiments, TPMS sensors may be used to determine information on the rotational frequency of the wheel. A TPMS sensor may be mounted on the cover of the tire such that a g-pulse is measured when the TPMS sensor hits the surface of the road. An acceleration sensor may be used in the TPMS sensor, e.g. for that purpose. The TPMS sensor may be equipped with an energy harvester or a nano generator, e.g. as they are used in battery-free TPMS sensors, which converts the mechanical energy of the pulse when the TPMS sensor hits the ground into an electrical signal from which the information on the rotational frequency of the wheel can be determined. Battery driven sensors or modules as well as other mounting places, e.g. at the valve of the wheel or tire, are also conceivable. In further embodiments a system may use a gravitational acceleration sensor to determine the information on the rotational frequency of the wheel, e.g. by making use of gravity. Yet another embodiment of the system may comprise a TPMS sensor to obtain the information on the rotational frequency of the wheel by evaluating the cyclic variations of the TPMS-RF signals. A magnetic field sensor rotating in the magnetic field of the earth may be used in a similar way.

Table 1 gives an overview on some examples of which sensors or functions may be verified (increased fail-safe likelihood) in a tire pressure measurement module in some embodiments:

TABLE 1

| Verified function | First Sensor 21 | Second sensor 22 | Comment |
| --- | --- | --- | --- |
| Motion detection | a-sensor or B-sensor | B-sensor or a-sensor | |
| Motion detection | a-sensor or B-sensor | p-sensor | Via p-sensor noise level during rotation |
| Contact patch length | a-sensor | B-sensor | |
| Tire pressure | p-sensor | a-sensor or B-sensor | Plausibility check via contact patch length |
| Tire pressure | p-sensor | a-sensor or B-sensor | p-cliagnosis-check via noise level and motion data |
| Temperature measurement | T-sensor | T-detector | |
| Temperature compensation of other sensors | T-sensor | T-detector | |

For example, in an embodiment, the first signal indicates a tire pressure of a tire of a vehicle (so the first sensor 21 is a pressure sensor), and the second signal indicates a rotational speed and a contact patch size or footprint length of the tire (so the second sensor 22 may be an acceleration, gravitational or magnetic field sensor). The control module 16 may then be configured to determine noise level information of the first signal, to determine rotational speed information based on the noise level information and to verify the rotational speed information based on the second signal. Hence, the control module 16 may be configured to verify the first signal by correlating a noise level or a rotational speed indicated by the first signal with a rotational speed indicated by the second signal. As further indicated in FIG. 2 the control module 16 may be configured to generate warning information if the correlation lies below a threshold (the warning information is indicated by the warning light 28 in the embodiments of FIGS. 2 and 3). In the embodiment depicted in FIG. 3 the warning indication may be generated in the wheel unit 20b and transmitted to the stationary unit 20a before finally being used to trigger the warning light 28.

Herein, a correlation is to be understood as a measure of similarity between signals or information indicated by signals. The threshold comparison is to be understood as a measure for the similarity—the higher the similarity the higher the correlation output, hence, if a similarity value is below the threshold, the signals or information is not similar enough. In other embodiments, a high similarity/correlation may as well be expressed as a low value and the threshold comparison may be carried out as an evaluation whether the threshold is exceeded, in case of which the warning signal/information is output.

In another embodiment, motion detection may be further secured using an a-sensor (first sensor 21) and a p-sensor (second sensor 22), a B-sensor (first sensor 21) and a p-sensor (second sensor 22), respectively. The p-sensor provides an increased noise level once the tire or wheel starts rotating. The noise is evoked by pressure or compression waves on the inside of the tire, which are evoked by the rotation and vibrations related thereto. Moreover, the pressure sensitive membrane may be sensitive to vibrations, which are transferred to or by a housing of the sensor (s). The noise level may be compared to the motion level (e.g. a rotational frequency) determined using an a-sensor or a B-sensor. If a correlation is determined, correct functioning of the p-sensor may be verified as well. If the pressure signal is erroneous (e.g. if it freezes) the noise level does not correlate with the motion information anymore and a failure may be detected.

For example, motion detection may be further secured (increased fail-safe probability) in an embodiment. An acceleration sensor may be used to measure the gravitational field of the earth (e.g. the first sensor 21 may be an acceleration sensor) and a magnetic field sensor may be used to measure the magnetic field of the earth (e.g. the second sensor 22 may be a magnetic field sensor). Both sensors may deliver sinusoidal output signals in case the tire rotates. Both signals may serve as a basis for detecting the state of motion of the tire (rotational frequency and angular information) and quantities or measures derived therefrom, e.g. a contact patch size, independently. One may hence serve to verify the other.

In another embodiment, a pressure measurement may be secured using an a-sensor or a B-sensor via the contact patch length. For example, in a tire pressure module tire/wheel unit 20b a plausibility check may be carried out for the pressure signal based on a comparison with a contact patch length. Signals of the motion sensors (a-sensor or B-sensors) can be used to determine a length of the contact patch area. The length of the contact patch area may depend on the pressure of the tire and the physical load of the vehicle. If a pressure loss is determined during operation of the vehicle by the pressure sensor but the length of the contact area does not change, a failure of the pressure sensor may be likely. The control module 16 may hence be configured to determine footprint length information of the tire based on the first signal, and to verify the footprint length information based on the second signal. The control module 16 may be configured to verify the first signal by correlating a footprint length of the tire indicated by the first signal with a footprint length of the tire indicated by the second signal. The control module 16 may be configured to generate warning information if the correlation lies below a threshold.

Some embodiments may enable plausibility checks on a system level of a TPMS which can be used to improve a robustness of the system as fail-safe mechanisms may be implemented.

FIG. 4 shows a block diagram of a flow chart of an embodiment of a method for monitoring a first sensor 21 of a tire pressure monitoring system 20. The fail-safe method comprises inputting 42 a first signal from the first sensor 21. The first signal indicates a first physical quantity. The method further comprises inputting 44 a second signal from a second sensor 22. The second signal indicates a second physical quantity. The method further comprises verifying 46 the first signal based on the second signal and a physical relation between the first and second physical quantities.

Another embodiment is a computer program product comprising a computer readable medium having computer readable program code embodied therein, the computer readable program code being configured to implement one or more of the above described methods, when/if being loaded on a computer, a processor, or a programmable hardware component. Another embodiment is a computer program having a program code on a non-transitory media for performing, when/if the computer program is executed on a computer or on a processor, one of the above methods. A further embodiment is a computer readable storage medium storing instructions which, when/if executed by a computer, cause the computer to implement one of the methods described herein.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "means", may be provided through the use of dedicated hardware, such as "a processor", "a sensor", "a controller", "a transmitter", "a receiver" etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple sub-steps. Such sub-steps may be included and part of the disclosure of this single step unless explicitly excluded.

What is claimed is:

1. A fail-safe device configured to monitor a first sensor of a tire pressure monitoring system, the fail-safe device comprising:
a first input configured to receive a first signal from the first sensor, the first signal indicating a first physical quantity;
a second input configured to receive a second signal from a second sensor, the second signal indicating a second physical quantity; and
a control module configured to verify at least one of the first signal or the second signal, wherein the first signal is verified based on the second signal and based on a physical relation between the first physical quantity and the second physical quantity, and the second signal is verified based on the first signal and based on the physical relation between the first physical quantity and the second physical quantity,
wherein the first signal indicates a tire pressure of a tire of a vehicle, and the second signal indicates at least one of a rotational speed of the tire and a contact patch size or footprint length of the tire.

2. The fail-safe device of claim 1, wherein the control module is configured to generate a signal indicating a failure on a condition the verification of the first signal fails.

3. The fail-safe device of claim 1, wherein the first sensor is one of a pressure sensor, an acceleration sensor, a magnetic field sensor, or a temperature sensor.

4. The fail-safe device of claim 1, wherein the second sensor is one of a pressure sensor, an acceleration sensor, a magnetic field sensor, or a temperature sensor.

5. The fail-safe device of claim 1, wherein the first and the second sensors are comprised in a tire pressure monitoring module.

6. The fail-safe device of claim 1, wherein the second sensor is an acceleration sensor or a magnetic field sensor.

7. The fail-safe device of claim 6, wherein the control module is configured to determine noise level information of the first signal, to determine rotational speed information based on the noise level information, and to verify the rotational speed information based on the second signal.

8. The fail-safe device of claim 7, wherein the control module is configured to verify the first signal by correlating a noise level or a rotational speed indicated by the first signal with the rotational speed indicated by the second signal, and wherein the control module is configured to generate warning information if the correlation is below a threshold.

9. The fail-safe device of claim 1, wherein the control module is configured to determine footprint length information of the tire based on the first signal, and to verify the footprint length information based on the second signal.

10. The fail-safe device of claim 9, wherein the control module is configured to verify the first signal by correlating a footprint length of the tire indicated by the first signal with a footprint length of the tire indicated by the second signal, and wherein the control module is configured to generate warning information if the correlation is below a threshold.

11. The fail-safe device of claim 1, wherein the first and the second physical quantities are different.

12. A tire pressure measurement system comprising:
- a first input configured to receive a first signal from the first sensor, the first signal indicating a first physical quantity;
- a second input configured to receive a second signal from a second sensor, the second signal indicating a second physical quantity; and
- a control module configured to verify the first signal based on the second signal and based on a physical relation between the first physical quantity and the second physical quantity.

13. A tire comprising the tire pressure monitoring system of claim 12.

14. A fail-safe method for monitoring a first sensor of a tire pressure monitoring system, the fail-safe method comprising:
- inputting a first signal from the first sensor, the first signal indicating a first physical quantity;
- inputting a second signal from a second sensor, the second signal indicating a second physical quantity; and
- verifying at least one of the first signal or the second signal, wherein the first signal is verified based on the second signal and a physical relation between the first and second physical quantities, and the second signal is verified based on the first signal and based on the physical relation between the first physical quantity and the second physical quantity,
- wherein the first signal indicates a tire pressure of a tire of a vehicle, and the second signal indicates at least one of a rotational speed of the tire and a contact patch size or footprint length of the tire.

15. A computer program product comprising a non-transitory computer readable medium having computer readable program code embodied therein, the computer readable program code being configured to implement a fail-safe method for monitoring a first sensor of a tire pressure monitoring system, the fail-safe method comprising:
- receiving a first signal from the first sensor, the first signal indicating a first physical quantity;
- receiving a second signal from a second sensor, the second signal indicating a second physical quantity; and
- verifying at least one of the first signal or the second signal, wherein the first signal is verified based on the second signal and a physical relation between the first physical quantity and the second physical quantity, and the second signal is verified based on the first signal and based on the physical relation between the first physical quantity and the second physical quantity,
- wherein the first signal indicates a tire pressure of a tire of a vehicle, and the second signal indicates at least one of a rotational speed of the tire and a contact patch size or footprint length of the tire.

16. The fail-safe device of claim 6, wherein the control module is configured to determine noise level information of the first signal, to determine rotational speed information based on the noise level information, and to verify the rotational speed indicated by the second signal based on the rotational speed information derived from the first signal.

17. The fail-safe device of claim 16, wherein the control module is configured to verify the second signal by correlating a noise level or a rotational speed indicated by the first signal with the rotational speed indicated by the second signal, and wherein the control module is configured to generate warning information if the correlation is below a threshold.

* * * * *

UNITED STATES PATENT AND TRADEMARK OFFICE
CERTIFICATE OF CORRECTION

PATENT NO. : 10,252,583 B2
APPLICATION NO. : 15/697546
DATED : April 9, 2019
INVENTOR(S) : Michael Kandler, Thomas Lange and Jooil Park Page 1 of 1

It is certified that error appears in the above-identified patent and that said Letters Patent is hereby corrected as shown below:

On the Title Page

Item (30) for foreign application priority data, delete "10 2006 116 698.7" and insert therefore --10 2016 116 698.7--.

Signed and Sealed this
Fourteenth Day of July, 2020

Andrei Iancu
*Director of the United States Patent and Trademark Office*